United States Patent

Walsh et al.

[15] 3,642,463

[45] Feb. 15, 1972

[54] PURIFICATION OF BERYLLIUM

[72] Inventors: Kenneth A. Walsh, Fremont; Andrew J. Sandor, Perrysburg, both of Ohio

[73] Assignee: The Brush Beryllium Company, Cleveland, Ohio

[22] Filed: Aug. 8, 1969

[21] Appl. No.: 848,750

Related U.S. Application Data

[63] Continuation-in-part of Ser. No. 573,874, Aug. 22, 1966, abandoned.

[52] U.S. Cl. .................................... 75/0.5, 75/121, 134/3, 134/41
[51] Int. Cl. ..................... C22b 9/00, C22b 9/08, C22b 9/14
[58] Field of Search ...................... 75/0.5, 101, 121; 23/24.2; 134/3, 41

[56] References Cited

UNITED STATES PATENTS

| | | | |
|---|---|---|---|
| 2,489,116 | 11/1949 | Young | 134/41 |
| 3,441,405 | 4/1969 | Rhodes | 75/121 |

*Primary Examiner*—L. Dewayne Rutledge
*Assistant Examiner*—W. W. Stallard
*Attorney*—McNenny, Farrington, Pearne & Gordon

[57] ABSTRACT

There is provided a process for reducing the impurity content of particulate beryllium characterized by forming a slurry with an acidic solution, agitating the slurry at a temperature below the boiling point of the solution while maintaining the acidity below a pH of about 3.5 until impurities are dissolved in the solution, and separating the beryllium from the impurity-containing solution.

14 Claims, No Drawings

3,642,463

PURIFICATION OF BERYLLIUM

RELATED APPLICATIONS

This application is a continuation-in-part of copending application Ser. No. 573,874 filed Aug. 22, 1966, and now abandoned.

This invention relates generally to the purification of beryllium and more specifically to the removal of impurities from particulate beryllium by acid leaching.

Particles of beryllium which may be treated in accordance herewith include recycle beryllium scrap such as saw sludges, mill chips, skinning product, machine turnings, etc., as well as finely divided beryllium. These particles may range in size up to one-eighth inch in at least one direction.

The phrase "finely divided beryllium" wherever it appears in this specification is intended to mean beryllium powder having a particle size ranging from subsieve micron size to minus 100 mesh.

Prior art methods of purification of beryllium have generally been directed to removal from beryllium-containing ore of impurities associated with beryllium. The purification techniques involved treatment of solutions resulting from ore processing with various chemical agents. Such treatment includes the addition of agents which are potential sources of contamination. However, while such methods have provided substantially pure beryllium, various impurities remained in significant quantities. Since beryllium must be ultrapure for optimum efficiency in nuclear and structural applications, as well as in fabrication operations, it is highly desirable to eliminate or reduce residual impurities to a minimum.

It is, therefore, an object of this invention to substantially reduce the impurity content of beryllium.

A further object is to substantially reduce the impurity content of beryllium while retaining substantially the initial quantity of beryllium.

Accordingly, the invention comprises a method of purifying particulate beryllium by forming a slurry of the beryllium particles with an acid selected from the group consisting of sulfamic, oxalic, phosphoric, nitric and sulfuric acids at room temperature, agitating the slurry at a temperature ranging from room temperature to just below the boiling temperature of the acids while maintaining the hydrogen ion concentration of the slurry at less than about pH 3.5 until impurities are dissolved in the acid solution, and separating the beryllium particles from the impurities in the solution. Mixtures of the previously recited acids may also be used effectively in the process of the invention. Any soluble salt of the above-mentioned acids which hydrolyzes to provide the desired acidity range may be used in place of these acids. For example, we have found aluminum nitrate, beryllium nitrate and beryllium sulfate are particularly effective in purifying beryllium.

The process is capable of efficiently removing impurities from beryllium particles of minus one-eighth inch or finer. The best purification results were obtained by employing finely divided beryllium powder particles ranging from subsieve size of minus 20 microns to minus 200 mesh. While the final products obtained when the larger particle sizes are employed are advantageous for some uses, the finely divided particles ranging from minus 20 to minus 200 mesh provide a final product desirable for high-purity powder applications.

The temperature, as noted above, may cover a wide range extending from room temperature to below the boiling temperature of the acid and is, therefore, not critical other than to avoid loss of the acid by decomposition. While the slurry of the beryllium particles and acid is initially made at room temperature, in some cases an exothermic action results and the temperature rises considerably and, for practical purposes, should be kept below the boiling temperature of the particular acids or soluble salts thereof which are employed.

The slurry should be agitated for a sufficient time to remove the impurities from the beryllium and, although not critical, is generally from 2 to 6 hours where small quantities of particulate beryllium are employed. However, the time may vary con-

TABLE I.—ACID PURIFICATION OF BERYLLIUM POWDER

| Example | Solution | Be. particle size | Contact time (hours) | Max. temp., (°C.) | Terminal pH | Al, p.p.m. | BeO, percent | C, percent | Cr, p.p.m. | Fe, p.p.m. | Mg, p.p.m. | Mn, p.p.m. | Si, p.p.m. | Ti, p.p.m. | Weight Loss percent |
|---|---|---|---|---|---|---|---|---|---|---|---|---|---|---|---|
| | | | | | | | | | Product analysis | | | | | | |
| 1 | Nitric | −100 mesh | 4.0 | 29.8 | 0.50 | 220 | | | 70 | 786 | 65 | 30 | 180 | 230 | 0.5 |
| 2 | do | −200 mesh | 2.0 | 29.0 | 1.00 | 150 | | | 50 | 830 | | 30 | 350 | 170 | 1.0 |
| 3 | do | do | 4.0 | 30.0 | | 160 | | | 70 | 1,054 | | 40 | 177 | 70 | 1.9 |
| 4 | do | do | 6.0 | 28.5 | | 120 | 1.58 | 0.046 | 90 | 950 | | | 290 | | 1.28 |
| 5 | do | −10 micron | 4.0 | 28.5 | 0.50 | 110 | 5.02 | | 50 | 608 | | 7 | 195 | 120 | 2.17 |
| 6 | do | −100 mesh | 4.0 | 33.5 | 0.50 | 230 | | | 20 | 772 | 60 | 15 | 350 | 80 | 0.5 |
| 7 | Sulfamic | −200 mesh | 4.0 | 33.0 | 1.30 | 430 | | | 25 | 830 | 20 | 40 | 170 | 25 | 1.5 |
| 8 | do | do | 2.0 | 30.0 | 0.90 | 195 | 2.05 | 0.050 | 15 | 800 | | 27 | 350 | 15 | 2.27 |
| 9 | do | do | 4.0 | 29.0 | 1.10 | 200 | 1.84 | | 8 | 1,108 | 70 | 20 | 270 | 8 | 4.4 |
| 10 | do | −17 micron | 4.0 | 41.0 | 1.35 | 125 | 1.86 | 0.120 | 15 | 700 | | N.D. | 250 | 80 | 8.5 |
| 11 | do | −10 micron | 4.0 | 35.0 | 1.40 | 200 | | | 55 | 1,000 | | 52 | 220 | 110 | 6.8 |
| 12 | Phosphoric | −5 micron | 2.0 | 35 | 2.75 | 380 | 5.04 | | | 902 | | 60 | 400 | 210 | 2.0 |
| 13 | do | −200 mesh | 6.0 | 35.2 | 2.60 | 580 | 1.99 | 0.047 | 15 | 1,230 | | 64 | 350 | 180 | |
| 14 | Sulfuric | −17 micron | 2.0 | 25.1 | 2.50 | 250 | 1.87 | | 15 | 968 | | 35 | 200 | 200 | 15.5 |
| 15 | do | −200 mesh | 6.0 | 54.0 | 2.95 | 340 | 2.08 | | 15 | | | 25 | 340 | 60 | 3.6 |
| 16 | Oxalic | −17 micron | 3.0 | 30 | 3.25 | 180 | | | 12 | 866 | 45 | 15 | 280 | 50 | |
| 17 | Be nitrate | −200 mesh | 2.0 | 50.5 | 2.95 | 300 | 2.27 | | 60 | 800 | | 35 | 130 | 15 | 4.0 |
| 18 | Al nitrate | −10 micron | 5.5 | 50.0 | 2.60 | 40 | 3.95 | | 95 | 950 | 95 | | 340 | 130 | 1.12 |
| | | −200 mesh | 2.0 | 25.0 | 2.60 | 330 | | | | | | | | 200 | |
| | | | | | | Typical Analysis of Feed Powers | | | | | | | | | | |
| | | −100 mesh | | | | 680 | | | 105 | 1238 | 70 | 111 | 300 | 280 | |
| | | −200 mesh | | | | 900 | 1.85 | 0.132 | 120 | 1,473 | 140 | 100 | 400 | 240 | |
| | | −17 micron | | | | 850 | 1.84 | 0.089 | 78 | 1,274 | 150 | 86 | 380 | 150 | |
| | | −10 micron | | | | 700 | 6.58 | | 95 | 1,576 | | 116 | 330 | 160 | |
| | | −5 micron | | | | 1,000 | 6.61 | 0.260 | 160 | 1,220 | | 236 | 600 | 650 | |

TABLE II.—VARIABLES IN NITRIC ACID PURIFICATION OF BERYLLIUM POWDER

| Example | Variable | Terminal pH | Contact time | Max. temp. (° C.) | Al | Fe | Si | Weight loss, percent |
|---|---|---|---|---|---|---|---|---|
| Variable Slurry Concentration—Grams beryllium per liter of 1.0 N HnO₃ | | | | | | | | |
| 19 | 70 g./l | | 20 hours | 28.6 | 92 | 15 | 53 | 4.73 |
| 20 | 200 g./l | 0.6 | 4 hours | 28.6 | 86 | 41 | 45 | 0.85 |
| 21 | 400 g./l | 0.6 | do | 30.0 | 83 | 39 | 38 | 0.75 |
| 22 | 600 g./l | 0.7 | do | 35.5 | 85 | 30 | 42 | 0.88 |
| 23 | 800 g./l | 2.25 | do | 41.0 | 87 | 44 | 40 | 1.42 |
| Variable Acid Concentration—at 800 grams beryllium per liter of acid | | | | | | | | |
| 24 | 1.0 N | 2.25 | 4 hours | 41.0 | 87 | 44 | 40 | 1.42 |
| 25 | 2.0 N | 1.20 | do | 42.3 | 86 | 42 | 45 | 1.68 |
| Variable Contact Time—at 400 grams beryllium per liter of 1.0 N HNO₃ acid | | | | | | | | |
| 26 | 4.0 | 0.6 | 4 hours | 30.0 | 83 | 39 | 38 | 0.75 |
| 27 | 6.0 | 0.5 | do | 28.7 | 86 | 30 | 50 | 1.28 |
| 28 | 20.0 | 0.6 | do | 28.6 | 87 | 48 | 33 | 1.08 | siderably depending on the quantity of beryllium being purified and the amount of impurities therein contained.

While the particle size of beryllium powder generally ranges from subsieve size to minus 100 mesh, the particle size of minus 15 microns to minus 200 mesh is preferred. The concentration of beryllium powder in the slurry generally ranges from 70 grams per liter to 800 grams per liter of acid, but is preferably from 200 grams per liter to 450 grams per liter of acid. In the case of nitric acid, a concentration of 350 grams to 450 grams of beryllium per liter of normal nitric acid solution is preferred. In the case of sulfamic acid, the concentration of the slurry should be a maximum of 200 grams of beryllium per liter of normal sulfamic acid.

The hydrogen ion concentration of the slurry should be maintained at a pH ranging from about 0.0 to about a maximum of 3.5 and preferably ranging from about 0.0 to about 1.5. The particulate beryllium may be separated from the impurities present in the solution after completion of the purification process by any conventional manner, but is generally separated by filtration. The particulate beryllium is then further washed and dried by conventional procedures.

The examples included in the following Tables I and II are presented for purposes of illustration and further explanation of the invention. It will be seen from Table I that the above-mentioned acids are respectively employed to purify particulate beryllium of varying particle sizes and at varying times and temperature. By comparing the purified beryllium product with the initial feed analysis, it will be seen that exceptionally pure beryllium is obtainable by the method of the invention. In all the examples presented in Table I, a slurry was prepared from 200 grams of beryllium powder per liter of 1.0 normal solution of acid, with the exception of Example 15 where the normality of sulfuric acid was initially 0.69. It will also be observed from Table I that the loss of beryllium metal in most cases was less than 2.0 percent of the starting metal.

Since nitric acid appeared to produce the most beneficial overall results, more detailed investigations of this acid were made. The results of these tests are shown by the examples presented in Table II. From Table II it will be observed that the slurry concentration may vary from 70 grams per liter of normal acid to 800 grams per liter of normal acid, and preferably should be maintained at 70 grams to 400 grams per liter of normal nitric acid. Also, the acid concentration had insignificant effect on purification when increased from one normal to two normal.

The mixture of acid and particulate beryllium should be agitated for a minimum of 2 hours, but preferably should be agitated for 4 hours. However, as will be noted from Tables I and II, agitation for periods greater than 4 hours has little effect on purification when small quantities of particulate beryllium are used.

It will be noted that the process of the invention has many advantages in providing a high-purity particulate beryllium in an economical and simple manner. Thus, the process may be employed for purification of scrap material to obtain a much more desirable product, or to obtain ultrahigh purity metal from a high-purity beryllium powder.

What is claimed is:

1. A method of purifying particulate beryllium comprising forming a slurry of said beryllium with a solution selected from the group consisting of sulfamic, oxalic, phosphoric, nitric and sulfuric acid solutions and mixtures of said acid solutions at room temperature and containing from about 70 grams to about 800 grams of said particulate beryllium per liter of acid solution, agitating the slurry at a temperature ranging from room temperature to just below the boiling temperature of the acid, while maintaining the hydrogen-ion concentration of the slurry ranging from a pH of about 0.0 to a maximum of about 3.5 until impurities are dissolved in the acid solution, and separating the particulate beryllium from the solution.

2. The process according to claim 1 wherein the pH is maintained in a range from a minimum of about 0.0 to a maximum of 1.5.

3. The process according to claim 1 wherein the particles of beryllium range from about minus one-eighth inch to about minus 20 microns.

4. The process according to claim 1 wherein the loss of beryllium metal is not greater than 2 percent by weight of the beryllium content of the input powder.

5. The process according to claim 1 wherein the particulate beryllium is separated from the solution by filtration, washed and dried.

6. The process according to claim 1 wherein the particulate beryllium is finely divided beryllium powder.

7. The process according to claim 6 wherein nitric is the selected acid solution, the slurry contains from about 70 grams to about 400 grams of finely divided beryllium powder, and the maximum pH is about 1.5.

8. The process according to claim 6 wherein sulfamic is the selected acid solution, the slurry contains from about 70 to about 200 grams of finely divided beryllium powder, and the maximum pH is about 1.80.

9. The process according to claim 6 wherein phosphoric is the selected acid solution, the slurry contains from about 70 to about 200 grams of finely divided beryllium powder, and the maximum pH is about 2.7.

10. The process according to claim 6 wherein sulfuric is the selected acid solution, the slurry contains from about 70 to about 200 grams of finely divided beryllium powder, and the maximum pH is about 3.30.

11. The process according to claim 6 wherein oxalic is the selected acid solution, the slurry contains from about 70 to about 200 grams of finely divided beryllium powder, and the maximum pH is about 3.1.

12. The process according to claim 6 wherein the selected solution is a solution of a soluble salt of the acids which hydrolyze to provide the specified pH range.

13. The process according to claim 12 wherein the selected solution is a solution of the soluble aluminum and beryllium salts of the acids which hydrolyze to provide the specified pH range.

14. The process according to claim 12 wherein the solution is selected from the group consisting of aluminum nitrate, beryllium nitrate and beryllium sulfate.

* * * * *

UNITED STATES PATENT OFFICE
CERTIFICATE OF CORRECTION

Patent No. 3,642,463  Dated February 15, 1972

Inventor(s) Kenneth A. Walsh and Andrew J. Sandor

It is certified that error appears in the above-identified patent and that said Letters Patent are hereby corrected as shown below:

In Column 2, correct the following:

Example 3, under "Si ppm", the amount should read -- 170 --, not "177".

Example 9, under "Contact time (hours)", the number should read -- 2.0 --, not "1.0".

Example 11:
the figure under "Terminal, pH" should read -- 1.75 --;
the amount under "Al ppm" should read -- 280 --.

Under "Typical Analysis of Feed Powers", second item under "Mn ppm" should read -- 110 --, not "100"; under "Si ppm" the third item should read -- 390 --, not "380".

Signed and sealed this 18th day of July 1972.

(SEAL)
Attest:

EDWARD M. FLETCHER, JR.  ROBERT GOTTSCHALK
Attesting Officer  Commissioner of Patents